United States Patent [19]

Morris

[11] Patent Number: 4,745,670

[45] Date of Patent: May 24, 1988

[54] METHOD FOR MAKING CHEMICAL LASER NOZZLE ARRAYS

[75] Inventor: Donald H. Morris, Agoura, Calif.

[73] Assignee: Rockwell International Corporation, El Segundo, Calif.

[21] Appl. No.: 201,656

[22] Filed: Oct. 28, 1980

[51] Int. Cl.⁴ .......................... B23P 15/16; C25D 1/08
[52] U.S. Cl. ............................. 29/157 C; 29/163.5 R; 204/11
[58] Field of Search ........... 29/157 C, 163.5 R, 527.2, 29/557; 204/6, 11, 24, 281

[56] References Cited

U.S. PATENT DOCUMENTS

| | | | |
|---|---|---|---|
| 528,586 | 11/1894 | Bridgeman | 204/281 |
| 570,125 | 10/1896 | Forsyth et al. | 204/281 |
| 1,868,788 | 7/1932 | Zinser | 204/6 |
| 2,765,230 | 10/1956 | Tinklenberg | 204/11 |
| 2,905,614 | 9/1959 | Porrata et al. | 204/281 |
| 3,046,202 | 7/1962 | Horner et al. | 204/11 |
| 3,613,208 | 10/1971 | Seberg et al. | 29/163.5 R |
| 3,891,514 | 6/1975 | Klemm | 204/281 |
| 4,211,617 | 7/1980 | Hunyar | 204/6 |
| 4,246,076 | 1/1981 | Gardner | 204/11 |

FOREIGN PATENT DOCUMENTS 1251340 10/1967 Fed. Rep. of Germany .......... 204/6
2828625 9/1979 Fed. Rep. of Germany .......... 204/6

OTHER PUBLICATIONS

Gardner, William R., "Process for Fabrication of Ink Jet Orifices," from *Xerox Disclosure Journal*, Mar./Apr., 1979, vol. 4, No. 2, pp. 251, 252.

*Primary Examiner*—Daniel C. Crane
*Attorney, Agent, or Firm*—H. Fredrick Hamann; Harry B. Field

[57] ABSTRACT

A method for making chemical laser nozzle arrays in which individual mandrels are molded of plastic material in the shape of the nozzle openings. The mandrels are secured with the mouth end attached to a base plate. Metal is electrodeposited on the base plate to a thickness in excess of the length the mandrels project above the base plate. The surface of the deposited metal is ground down to expose the throat ends of the nozzle-forming mandrels. The deposited metal is separated from the base plate and the arbors removed to provide an array of nozzle openings in the deposited metal.

1 Claim, 3 Drawing Sheets

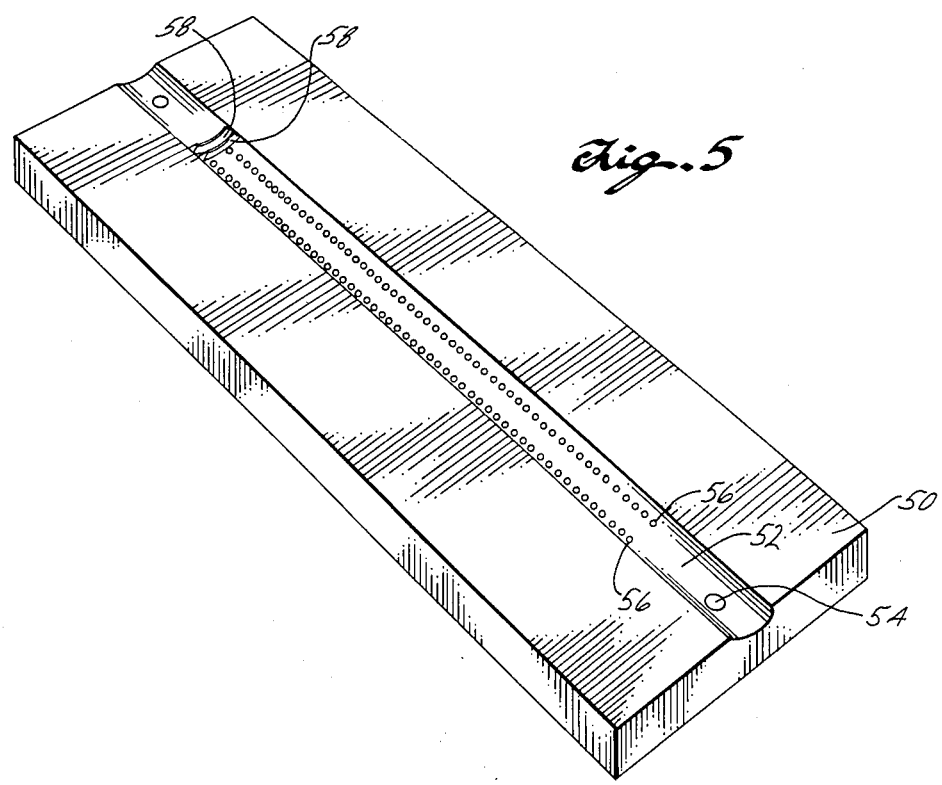
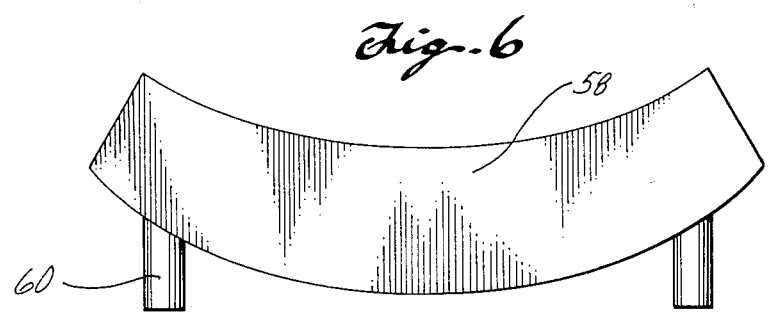

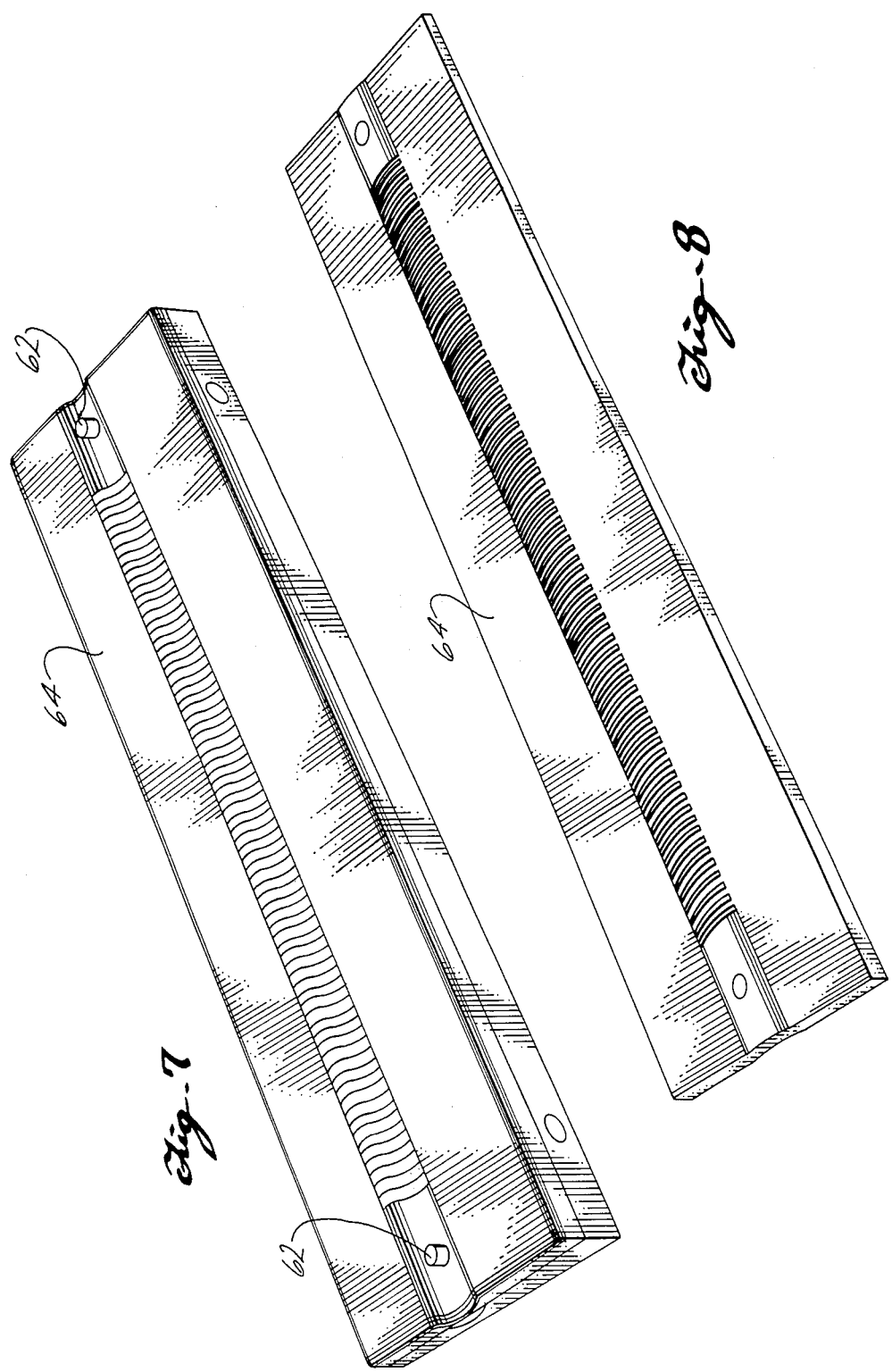

METHOD FOR MAKING CHEMICAL LASER NOZZLE ARRAYS

FIELD OF THE INVENTION

This invention relates to the manufacture of nozzle arrays or the like, and more particularly, to the manufacture of arrays of supersonic nozzles for chemical lasers.

BACKGROUND OF THE INVENTION

Chemical lasers are well-known in which a chemically pumped lasing action is obtained directly from gaseous molecules that are vibrationally excited through a chemical reaction. Typically hydrogen or deuterium is used as the fuel which reacts with an oxidizing agent such as a fluorine-containing compound. The fluorine atom containing gaseous material is expanded through a nozzle to form a supersonic jet, and the hydrogen is then diffused into the expanded jet flow mixture to effect a chemical reaction in an optical cavity whose axis is transverse to the flow. Multiple nozzle designs have been used to provide more efficient mixing between the fluorine-containing gas and the hydrogen. Such a multiple nozzle grid is shown, for example, in U.S. Pat. No. 3,688,215.

In the past such nozzle arrays or grids have been either machined from a single block of metal or assembled from individually machined elements. Either approach has proved very costly and time consuming. The shape of the supersonic nozzles results in surface contours which are difficult to machine. The nozzles may be quite small. For example, nozzles have been arranged in grids with as many as 700 or 800 nozzles per square inch. Nozzles may be either two-dimensional or three-dimensional types. They may change in cross-sectional shape over the length of the nozzle, as changing from a circular cross-section at the throat to a hexagonal cross-section at the mouth of the nozzle. The manufacture of such nozzles in compact arrays has been difficult to achieve.

SUMMARY OF THE INVENTION

The present invention is directed to an improved method of manufacture of nozzle arrays for chemical lasers or the like. However, the present invention may be useful in forming arrays of any type openings in a metal grid to a high degree of accuracy. The method of manufacture of the present invention has a number of advantages over other techniques heretofore used in forming nozzle arrays, namely, the method of manufacture is much faster, results in better precision and does not require skilled labor.

In brief, the method of manufacture of the present invention involves molding individual mandrels from plastic, rubber or other non-conducting material. The mandrels have the shape of the desired nozzle openings. The mouth ends of the nozzle-shaped mandrels are secured to the surface of a base plate with the "flow axis" of the nozzle-shaped mandrels extending perpendicular to the base plate surface. The mandrels are arranged in the desired pattern of the nozzle array with the throat ends projecting away from the plate. Nickel or other metal is then electroformed over the surface of the bare plate to a thickness in excess of the desired nozzle length. The nickel is then ground to a thickness equal to the length of the nozzle, exposing the throat end of the mandrels. After removal of the nickel plate from the base plate, the mandrels are removed, leaving nozzle-shaped openings through the nickel plate in the desired pattern for the array. The nickel nozzle plate is then used to form the nozzle section of a laser or the like.

BRIEF DESCRIPTION OF THE DRAWINGS

For a better understanding of the invention reference should be made to the accompanying drawings, wherein:

FIG. 5 is a perspective view of a base plate with several mandrels mounted thereon;

FIG. 6 is a detailed view of the mandrel used in connection with the base plate of FIG. 5;

FIG. 7 is a perspective view of the base plate after electrodeposition is complete; and FIG. 8 is a perspective view of the finished nozzle array.

DETAILED DESCRIPTION

Figure 1:
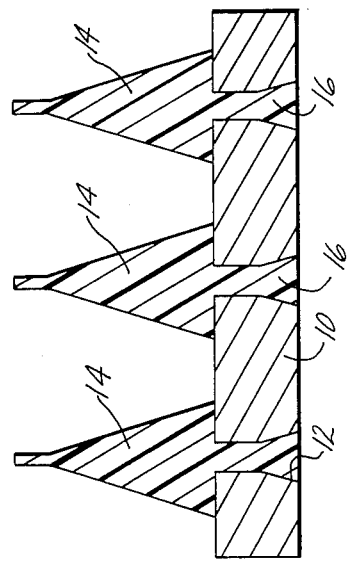
FIGS. 1-4 are sectional views showing sequential steps in the present invention.

Referring to FIGS. 1-4, the numeral 10 indicates generally a base plate made of stainless steel or other durable metal having a smooth top surface 11. A plurality of holes 12 are drilled or otherwise formed at spaced intervals corresponding to the axial spacing between the nozzles of the nozzle array being manufactured. A plurality of mandrels 14 are molded or otherwise formed out of rubber, plastic or other non-conductive material. Each mandrel has a surface conforming to the desired shape of an individual nozzle. To provide complete uniformity of nozzle shape in the finished array, the mandrels can be molded from a single cavity mold so that all the mandrels are substantially identical.

Each mandrel is formed with a projection 16 at one end which is adapted to fit in one of the holes 12 in the base plate 10. The projections 16 extend along the nozzle axis and extend from the end of the mandrel corresponding to the mouth of the nozzle being formed. The holes 12 may be flared outwardly in the direction extending away from the surface 11 on which the mandrels are mounted and the projections of the mandrels spread out in the flared openings to lock the mandrels in place on the base plate 10.

Figure 2:
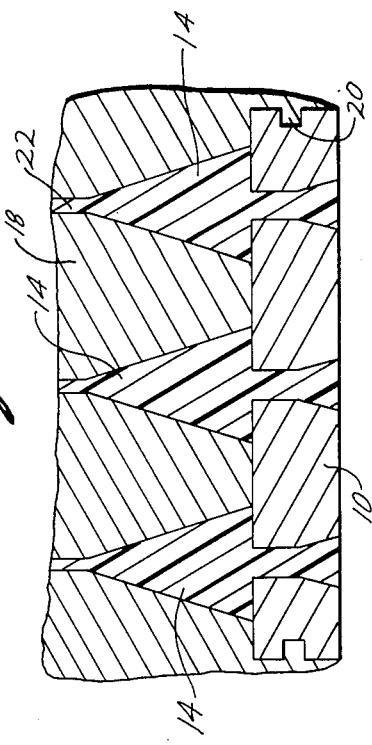

After the mandrels are secured to the base plate, as shown in FIG. 2, a metal material is deposited on the top of the surface 11 of the base plate 10 in the spaces between the mandrels. The metal is preferably electrodeposited on the top surface of the base plate 10 to a thickness which is in excess of the distance the mandrels 14 project above the surface of the base plate. A suitable material for the electrodeposited metal is nickel. While the nickel builds up a deposit on the conducting surface of the base plate 10, it does not build up on the surfaces of the non-conducting mandrels. Thus the plating forms a metal plate of substantially uniform thickness with void spaces formed by the mandrels. The base plate may be provided with shallow grooves 20 which act to mechanically lock the electrodeposited metal 18 to the base plate along either edge. However, the plating does not chemically bond to the base.

After the electrodeposition of the metal 18 is complete, the base plate can be mounted on a grinder and the top surface of the metal 18 ground down to a thickness corresponding to the desired length of the finished nozzles. The throat ends of the mandrels 14, as indicated at 22, are made slightly longer than the throat length of the finished nozzle to insure that when the grinding process takes place, the throat ends of the mandrels are fully exposed. The edges of the electrodeposited metal 18 are removed down to a surface flush with the sides of the base plate 10, thus removing the mechanical connection with the grooves 20. The grinding process having been completed, the nickel metal plate 18 can then be separated from the base plate 10 and the mandrels removed.

Figure 3:
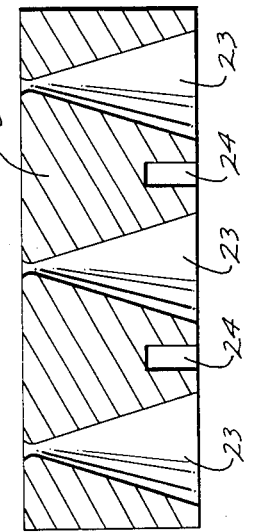
Figure 4:
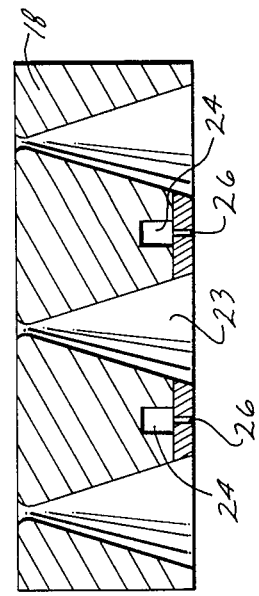

As shown in FIG. 3, the nickel metal plate 18 forms an array of nozzles of the exact size, shape and spacing required. Channels can be machined or otherwise formed in the regions between the mouths of the nozzles, as indicated at 24. These channels 24 are then closed off with thin metal strips 26 having orifices 28 through which the fuel is released into diffusing relationship with the oxidizer passing through the nozzles. The resulting nozzle array can be incorporated in a chemical laser device in a manner well-known to the art.

It should be noted that the base plate 10 can be reused but the mandrels 14 are not reused because the throat ends are ground away during the manufacturing process. However, the molding of the individual mandrels makes replacement of the mandrels with the manufacture of each nozzle array a relatively minor expense.

Since the mandrels control the size and shape of the nozzles in the finished nozzle array, the manufacturing process of the present invention can be used to form nozzles of any desired shape. Referring to FIGS. 5–8, there is shown an example of the manufacturing process of the present invention applied to another type of nozzle design. As shown in FIG. 5, a base plate 50 is formed with an arcuate groove 52 extending lengthwise of the plate. Dowel pin holes 54 are drilled at opposite ends of the groove 52. Two rows of smaller dowel pin holes 56 are also drilled along the length of the arcuate groove 52. Separately molded arcuate shaped mandrels 58 are provided with integrally molded pins 60 which are inserted into a pair of holes in the respective rows of holes 56 to hold the mandrels in place. Two of the mandrels 58 are shown in FIG. 5 as they are mounted on the base plate 50. The mandrels are shaped to provide the desired expanding nozzle openings to be formed in the finished nozzle plate.

After the mandrels 58 are mounted on the base plate 50 along substantially the full length of the groove 52, the metal base plate with the non-conductive mandrels are immersed in an electrodeposition tank and a layer of nickel or other suitable material is deposited on the surface of the plate by conventional electroforming techniques. The electrodeposited metal conforms to the arcuate groove between the mandrels. Before the electrodeposition, dowel pins 62 of non-conductive material are inserted in the holes 54 to form locating holes in the plate being formed. FIG. 7 shows the base plate after electrodeposition is complete. The assembly of FIG. 7, including the base plate 50, the imbedded mandrels 58 and the electrodeposited metal layer 64, is then anchored to the flat bed of a grinding tool and the exposed surface of the electrodeposited metal 64 is ground to the desired thickness and shape. The grinding includes shaping the roughly formed arcuate groove in the top surface of the formed nozzle plate. The electrodeposited metal plate 64 is then removed from the base plate 50 and the mandrels are removed, leaving a nozzle plate having the form shown in FIG. 8. It will be noted that the finished nozzle plate has a plurality of parallel nozzle slits formed in an arcuate surface. The nozzle plate can then be incorporated into a laser or other device to provide an array of nozzles through which the lasing gas is released into the optical cavity of the laser. FIGS. 5–8 illustrate the simplicity with which nozzle plates having relatively complex nozzle configurations can be made by the manufacturing method of the present invention.

It is to be understood that what has been described is merely illustrative of the principles of the invention and that numerous arrangements in accordance with this invention may be devised by one skilled in the art without departing from the spirit and scope thereof.

What is claimed is:

1. A method of forming supersonic nozzle arrays for lasers or chemical lasers, comprising the steps of: molding a plurality of mandrels in the shape of a nozzle opening, mounting the mandrels on a base plate with the ends of the mandrels corresponding to the throat end of the nozzles extending away from the plate, and electrodepositing metal on the plate to a structural depth greater than the length of the supersonic nozzles being formed, removing excess deposited material beyond said length, and removing said mandrels to provide the nozzle openings.

* * * * *